(No Model.) 3 Sheets—Sheet 1.
C. E. SWENEY.
CORN PLANTER.
No. 339,233. Patented Apr. 6, 1886.
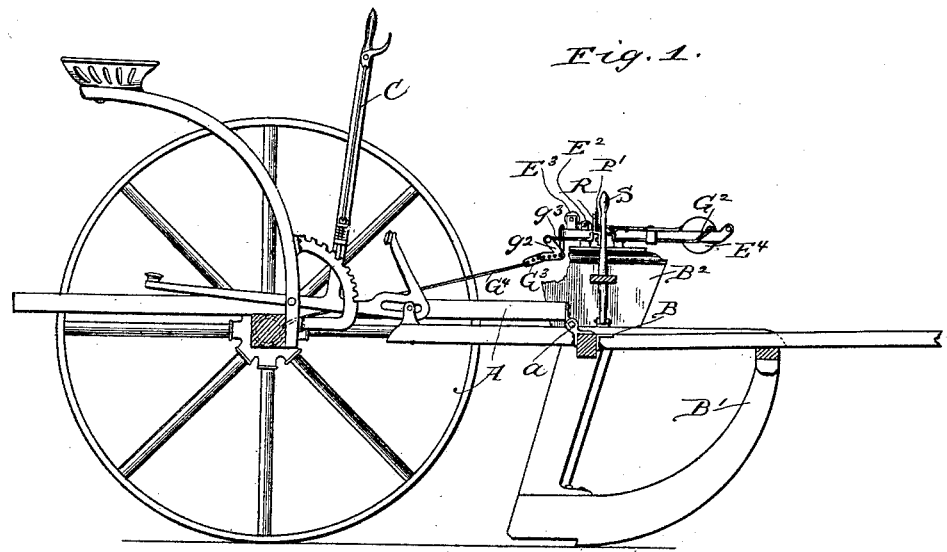
Fig. 1.
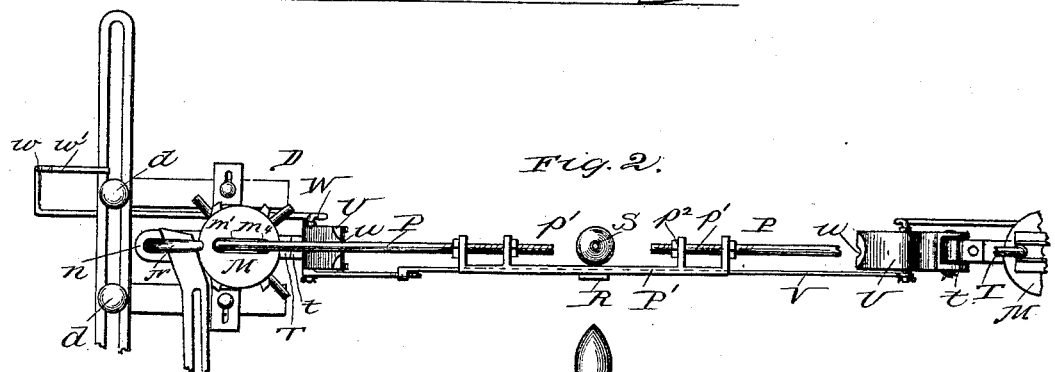
Fig. 2.
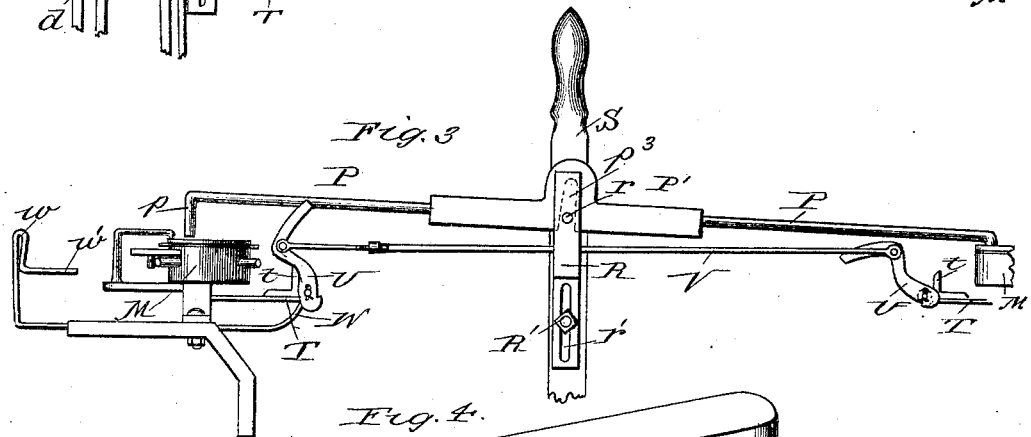
Fig. 3. Fig. 4.
Witnesses
W. Rossiter
Howard Hallock.
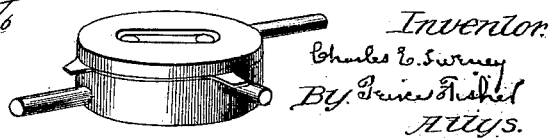
Fig. 5.
Inventor
Charles E. Sweney
By Price Fisher
Att'ys.

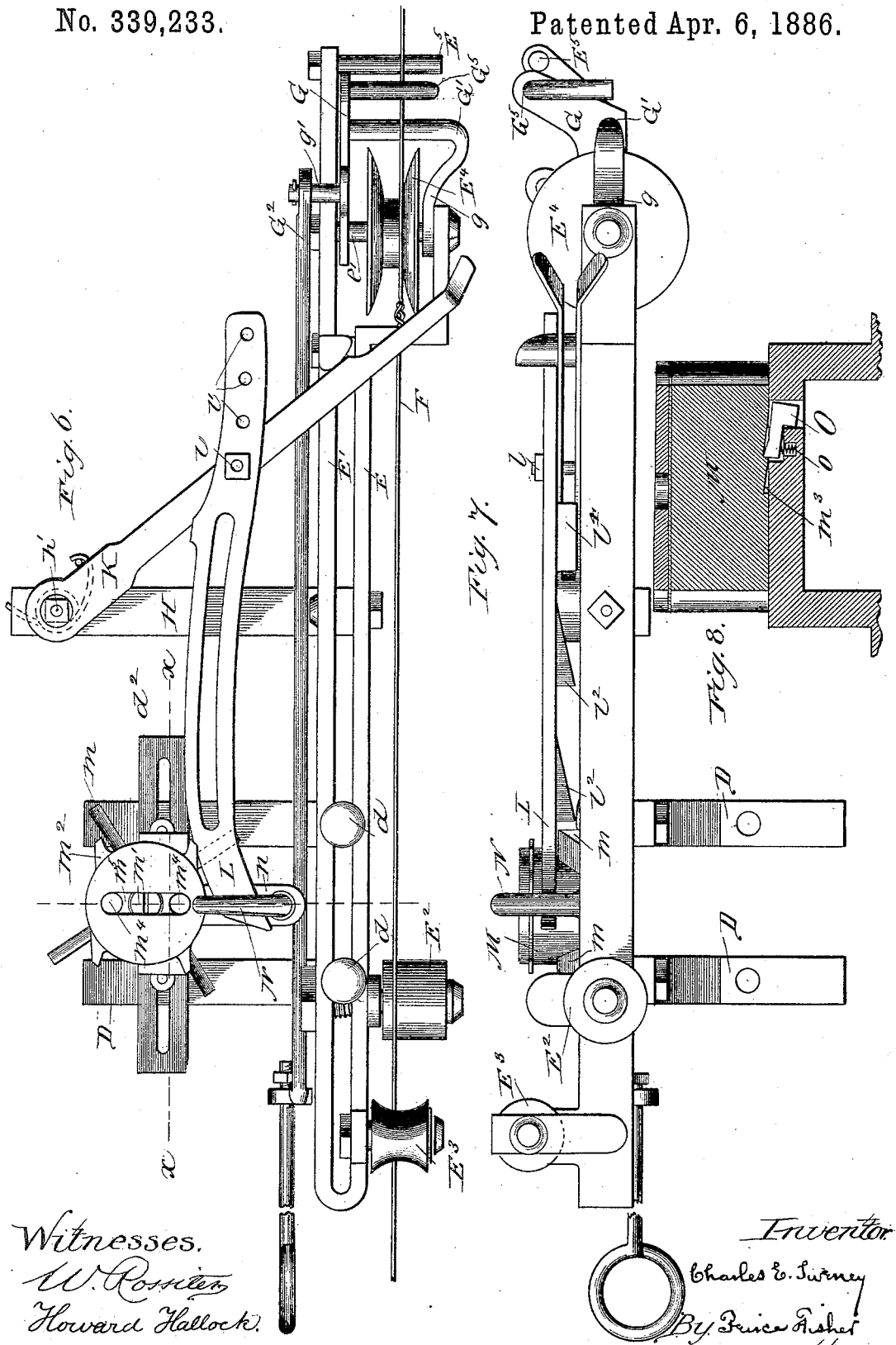

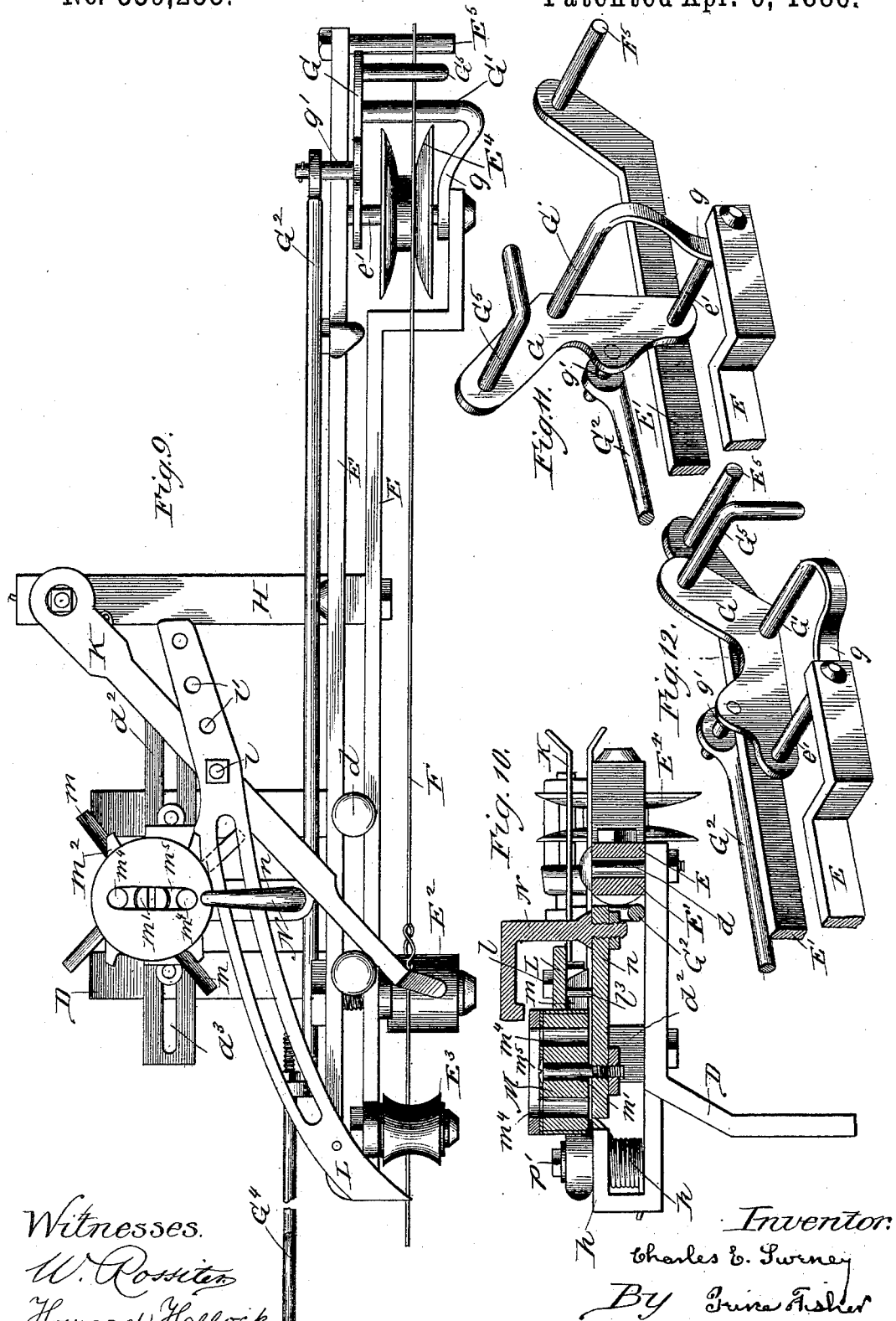

UNITED STATES PATENT OFFICE.

CHARLES E. SWENEY, OF PIERCETON, INDIANA, ASSIGNOR OF TWO-THIRDS TO CHARLES R. LONG, OF SAME PLACE, AND THEODORE J. HEAGY, OF KOSCIUSKO COUNTY, INDIANA.

CORN-PLANTER.

SPECIFICATION forming part of Letters Patent No. 339,233, dated April 6, 1886.

Application filed July 16, 1885. Serial No. 171,727. (No model.)

*To all whom it may concern:*

Be it known that I, CHARLES E. SWENEY, a citizen of the United States, residing at Pierceton, in the county of Kosciusko and State of Indiana, have invented certain new and useful Improvements in Corn-Planters, of which I do declare the following to be a full, clear, and exact description, reference being had to the accompanying drawings, forming part of this specification.

My present invention has relation to the improvement of corn-planters of that class commonly known as "check-rower corn-planters," wherein a cord or wire provided with knots or tappets and stretched across the field to be planted serves to automatically operate the feed-slides of the seed-boxes, in order to drop the grain at proper intervals. In this class of machines it is desirable that the tappet-wire shall be so sustained upon the check-rower mechanism of the planter that it can be readily thrown therefrom when the planter has crossed the field, and is about to be turned into the proper position to recross the field and plant the next succeeding rows of grain. Various devices have been heretofore proposed (such, for example, as that shown in my patent of March 7, 1882) whereby the operator, without dismounting from his seat upon the machine, can, by pulling a cord, operate a "throw-off" device that will serve to release the tappet-wire from the check-rower. It is desirable that the tappet-wire shall cease to operate the slides of the seed-boxes at the same time that the runners or plows that make the furrows for the grain are thrown out of action; and one of the objects of my present invention is to provide means whereby the lifting of the runners and the "throwing-off" of the tappet-wire will be simultaneously effected at one and the same operation.

To this end my invention consists in connecting a suitable throw-off device for the tappet-wire with the main frame or body of the planter in such manner that the operation of lifting the runners out of the ground will release the tappet-wire from its supports upon the machine.

My invention also consists in certain improvements in the throw-off device for the tappet-wire, which will be capable of use not only in the automatic manner above described, but will also be applicable in cases where the throw-off is to be operated by hand.

In order that the check-rower mechanism may operate the seed-slides at the proper intervals, it is necessary that this mechanism shall be secured upon the planter in such manner that its position can be adjusted in forward or backward direction, in order to cause the tappet-wire to engage the forked lever at the right instant to properly control the dropping of the grain.

To this end my invention consists in adjustably connecting the check-rower mechanism at each side of the machine to the brackets by which such mechanism is sustained.

In order that the tappet-wire may operate the seed-slides of the planter, it is customary to provide a lever suitably connected by intermediate mechanism with the shake-bar of the seed-slides, and provided at its ends with forks or prongs, with which the tappets or knots of the wire successively engage.

A further object of my present invention is to simplify and improve the mechansim which serves to communicate movement from the usual forked lever to the shake-bar of the seed-slides; and to this end my invention consists in the combination, with such lever, of a driving-pawl suitably connected therewith and engaging with a driving-wheel that is connected with an operating-rod that imparts movement to the rocking lever that actuates the shake-bar of the seed-slides. In this connection, also, my invention comprises various features of construction, as will hereinafter more fully appear.

In the most generally adopted construction of check-rower corn-planter there is placed at each side of the machine a forked lever and mechanism for communicating motion therefrom to the seed-slides of the grain-boxes. When the tappet-wire is in position upon one side of the machine, it is desirable that the mechanism at the opposite side should be thrown out of gear, so as not to be moved by the tappet-wire, as such movement would be useless, and would occasion an unnecessary wear of the parts. Means have been heretofore proposed whereby when the tappet-wire was placed upon one side of the machine the check-rower mechanism at the opposite side might be thrown out of action.

A further object of my invention is to provide improved mechanism whereby this throwing of a part of the check-rower mechanism into and out of gear can be more readily effected; and to this end my invention consists in the combination, with the rocking lever that moves the shake-bar, of an operating-rod suitably connected to said lever, extending across the machine, and detachably connected with the check-rower mechanism at each side of the machine, and suitable means for throwing said rod out of engagement with the operating mechanism at either side of the machine.

In this relation, also, my invention further consists in providing the device that disengages the operating-rod with a suitable connection extending into such position with respect to the supports for the tappet-wire that as the wire is placed upon its supports at one side of the machine the connection that leads to the disengaging mechanism may be operated, in order to throw the check-rower mechanism at the opposite side out of action.

My invention also consists in detachably connecting the operating-rod to the rocking lever, so that the seed-slides of the planter may at certain times be worked by hand without moving the check-rower mechanism.

My invention finally consists in certain novel details of construction, hereinafter described, illustrated in the accompanying drawings, and particularly defined in the claims at the end of the specification.

Figure 1 is a view in vertical longitudinal section of a check-rower corn-planter embodying my improvements. Fig. 2 is a plan view (parts being broken away) illustrating the manner of connecting the operating-rod with check-rower mechanism at each side of the machine. Fig. 3 is a front view of the parts illustrated in Fig. 2. Fig. 4 is a detail perspective view of a modified form of driving-pawl. Fig. 5 is a perspective view of a modified form of driving-wheel. Fig. 6 is a plan view of the check-rower mechanism at the side of the machine, and Fig. 7 is a side view of the same. Fig. 8 is a detail view, in vertical section on line $x$ $x$ of Fig. 6, of the driving-wheel. Fig. 9 is a plan view similar to Fig. 6, but showing the parts in different position. Fig. 10 is a view in transverse section. Fig. 11 is a detail perspective view of the swinging plate of the throw-off device. Fig. 12 is a view similar to Fig. 11, but showing the parts in different position.

A designates the main frame of the planter, to which there will be suitably connected by hinges, as at $a$, the frame B, that rests upon the runners B', and sustains the seed boxes or hoppers B², of well-known construction.

The main frame A is provided with suitable mechanism—such as the lever C and its connections—for lifting the runners out of the ground when the planter has reached the end of the field.

To each of the seed-boxes B² will be bolted the brackets D, provided at their outer ends with holes to receive the bolts $d$, that enter the space $e$ between the sides of the check-rower frame E E', and serve to secure this frame upon the brackets.

At the front end of the side E of the check-rower frame are placed the usual supporting-pulley, E², and retaining-pulley E³, for the tappet-wire F, and between the sides E and E' of the frame, at the rear end, are placed the flanged pulley E⁴ and the wrist-pin E⁵.

Upon the journal $e'$ of the flanged pulley E⁴ is pivotally held the swinging plate G, from the outer face of which extends the projection G', that is preferably furnished with the arm $g$, held upon the journal $e'$.

To the inner face of the swinging plate G is attached the stud $g'$, to which is attached the end of the rod G², that is in suitable connection with some part of the main frame of the planter. I prefer to connect the end of this rod to the elbow-lever $g²$, that is pivotally held upon the journal-stud $g³$, and by means of the link G³ is joined to the rod G⁴, the end of which encircles the hub of one of the planter-wheels, or is otherwise affixed to the main frame.

Near the end of the swinging plate G, I prefer to place the guard or finger G⁵, having the downwardly-bent end, as seen, to more securely hold the tappet-wire upon its supports.

From the foregoing description it will be seen that when the planter has crossed the field, and the operator by means of the lever C lifts the runners B' out of the ground, the upward movement of the frame B will cause the rods G² and G⁴ and elbow-lever G³ to throw the swinging plate into the position seen in Fig. 11, so that the tappet-wire will be lifted above the flanges of the pulley E⁴, and can freely fall from the machine.

The use of an elbow-lever between the rods G² and G⁴ is deemed advisable, as it communicates the movement to the swinging plate in a better manner; but it will be readily understood that the swinging plate G may be connected in any other suitable manner with the main frame of the planter.

The purpose of the link G³ is to enable the swinging plate to be operated only when the runners are lifted entirely out of the soil, and not when the runners are slightly elevated by irregularities of the ground. It will be noticed that the link G³ is provided with several holes whereby it may be adjustably connected with the rod G⁴, the purpose of this adjustment being to determine the position of the parts more accurately.

The brackets D at each side of the machine are connected together by means of the bridge-plate $d^2$, provided with the long slot $d^3$, which enables the brackets to be set at the proper distance to permit their bolts to enter the holes usually provided in corn-planters for the attachment of the check-rower mechanism.

My purpose in providing the check-rower frame E E' with the long slot or space $e$, through which the bolts $d$ pass, is to permit this frame to be adjusted forward or backward, in order to cause the tappet-wire to operate the seed-slides at the proper instant, or, in other words, to "regulate the drop of the grain."

To the frame E E' is bolted, as seen in Figs. 6 and 9, the bracket H, having the bent end $h$, through which passes the bolt or stud $h'$, that serves as a journal for the forked lever K, and also holds in place the coiled spring $k$, one end of which bears against the bracket, while the other end is attached to the forked lever and serves to retain the same in normally retracted position. From this construction it will be seen that when the frame E E' is adjusted in either a forward or backward direction it will move correspondingly the forked lever K, so that the tappet-wire will operate this lever at the proper time.

To the forked lever K is pivoted at $l$ the driving-pawl L, the rear portion of which is provided with a series of holes, $l'$, to enable the pawl to be properly adjusted to correspond with any alteration in the position of the forked lever. The under side of this driving-pawl is formed with the teeth $l^2$ and with the lugs or stops $l^3$ and $l^4$ at the front and rear portion of the pawl, respectively. The teeth $l^2$ of the driving-pawl are formed, as seen in Fig. 7, with the squared ends and the inclined under sides, the purpose of this construction being to enable the teeth to engage with the arms or projections $m$ of the drive-wheel M as the pawl is moved forward, and to permit the teeth to ride over these arms or projections as the pawl is retracted, and for like reason the arms $m$ are preferably formed as shown. The driving-wheel M is journaled upon the stud or bolt $m'$, that rises from the bridge-plate $d^2$, and from this bridge-plate extends the lateral arm or bracket $n$, that sustains the guard-finger N, that is bent as seen in Fig. 10. This guard-finger serves to hold the driving-pawl in engagement with the driving-wheel. The stop $l^3$ at the front end of the driving-pawl will prevent any accidental turning of the driving-wheel when the parts are in the position seen in Fig. 6, and the stop $l^4$ will perform a like office when the parts are in the position shown by Fig. 9, as in both instances these stops will serve to arrest the arms $m$ of the driving-wheel.

From the upper edge of the wheel M project the stop lugs or flanges $m^2$, the purpose of which is to prevent the pawl from rising out of engagement with the driving-wheel until the full stroke of the pawl is made.

By reference to Fig. 8 of the drawings it will be seen that the under side of the driving-wheel is provided with teeth $m^3$, with which engages the stop-pawl O, that is sustained by the bridge-plate, and the end of which is forced normally upward by the spring $o$, held in a suitable slot. This stop-pawl O prevents any backward movement of the wheel M as the driving-pawl is retracted.

In the upper face of the driving-wheel M is formed the slot $m^5$, at the ends of which are the holes or sockets $m^4$, adapted to receive the bent end $p$ of the operating-rod, which is preferably formed of the duplicate parts P, adjustably connected by means of the threaded ends $p'$ and nuts $p^2$ to the central part, P'. The central part, P', of the operating-rod is provided with the long slot $p^3$, within which fits the drive-pin $r$, carried by the bracket R, that is provided with the slot $r'$, and is adjustably connected by the bolt R' to the rocking lever S, that operates the shake-bar of the seed-slides.

From the construction of parts as thus far defined it will be seen that when a tappet or knot upon the wire F strikes the forked lever K this lever is forced backward, and thus causes the driving-pawl L to turn the driving-wheel M a half-revolution. At this time the end $p$ of the operating-rod P will be in one of the seats $m'$, and the driving-wheel will thus cause this rod to move the rocking lever S, that moves the feed-slides. As the tappet of the wire F passes from the end of the forked lever, the latter is retracted by its coiled spring, and in moving back the teeth of the pawl L pass freely over the arms of the driving-wheel, which is held against backward movement by means of the stop-pawl O, and the forked lever is now in position to be struck by the next succeeding tappet.

It will be noticed that by placing the driving-pin $r$ upon an adjustable bracket, R, the position of this pin with respect to the operating-rod can be varied, and in this manner the throw of the rocking lever can be changed in order to regulate the movement of the seed-slide.

My purpose in forming the central part of the operating-rod with an open slot, $p^3$, and the free ends $p$ is to enable this rod to be readily lifted away from the rocking lever, so that this lever may be operated by hand when the check-rower mechanism is not to be used.

To the bridge-plate $d^2$, at each side of the machine, is connected a bracket, T, provided with the shoulder $t$, and to the end of this bracket is pivoted a lifting-lever, U, preferably of angular shape, as shown, and provided at its upper end with a seat, $u$, adapted to receive the operating-rod when the lifting-lever is thrown upward, as will presently appear. The lifting-levers at the opposite sides of the machine are connected together by means of the tie-rod V, pivotally joined to each of these levers in such manner that when one of the levers is lifted out of position the other lever will be depressed. The stop or shoulder $t$ of the bracket T serves to limit the backward movement of the lifting-lever.

To each of the lifting-levers U, at its upper portion, is pivotally connected the end of an extension-rod, W, which passes beneath the bridge-plate and the frame E E' of the check-rower, and has the upwardly-bent outer portion, $w$, which projects into the path of the tappet-wire, and the laterally-bent end $w'$, which rests upon the frame E E' and holds this rod in position.

From the foregoing construction it will be seen that when the tappet-wire is in position upon one side of the machine the lifting-lever V upon that side is in a depressed position, and the rod W is pressed inwardly. The connecting-rod is at such time in engagement with the driving-wheel upon the same side of the machine. If, now, the tappet-wire be thrown from one side of the machine and be placed upon the check-rower mechanism at the opposite side, it will be found necessary, in placing the wire upon its supports, to force inwardly the projecting portion $w$ of the rod W, and in so doing to move the lifting-levers V in such manner as to throw the operating-rod into engagement with the driving-wheel upon the side of the machine on which the wire is now held, and out of engagement with the driving-wheel upon the opposite side. This throwing of the operating-rod into and out of engagement by means of a projection extending into the path of the check-rower wire as it is being placed upon the machine will enable the operator at one and the same movement to connect the operating-rod with the check-rower mechanism at one side of the machine and disconnect it from the mechanism at the opposite side.

In some instances it may be desirable to employ the lifting-levers without the rod W, and in such case these levers will be connected with any suitable mechanism—such as a cord or rod—that will extend into convenient reach of the operator.

It will be readily understood that the operating-rod of my improved construction can be conveniently attached to rocking levers such as are at present commonly employed in planters designed to be operated by hand without the necessary interposition of a supplemental rocking lever.

In Figs. 4 and 5 of the drawings I have shown, respectively, a modification of the driving pawl and ratchet. In this modified construction the teeth will be formed upon the inner face of the pawl, and two of the arms of the driving-wheel will be made somewhat shorter than the others, so as to engage with the central teeth of the pawl. In this construction the plate $l^6$ upon the under side of the driving-pawl will insure the engagement of the pawl and driving-wheel until the former has completed its stroke, when the plate $l^6$ will ride over the arms of the driving-wheel as the pawl is drawn backward.

It will be readily understood that many of the details of construction above defined may be varied without departing from the spirit of my invention, and to such details, therefore, I do not wish to be understood as restricting my invention.

Having thus described my invention, what I claim as new, and desire to secure by Letters Patent, is—

1. In a corn-planter, the combination, with the main frame, the runners, the "lift-out" mechanism for the runners, and a check-rower having suitable supports for the tappet-wire, of a throw-off device for releasing the tappet-wire connected to the planter, whereby the operation of lifting out the runners will release the wire from its supports, substantially as described.

2. In a corn-planter, the combination, with the main frame, the runners, the lift-out mechanism for the runners, and a check-rower having suitable supports for the tappet-wire, of a throw-off device comprising a swinging plate or arm connected with the main frame of the planter, and provided with a projection for releasing the tappet-wire when the swinging plate is operated, substantially as described.

3. In a corn-planter, the combination, with the main frame, the runners, the lift-out lever, and the check-rower having suitable supports for the tappet-wire, of a throw-off device comprising a swinging plate or arm having a projection for retaining the tappet, and a guard hook or projection for holding the wire, and a rod connecting the swinging plate with the main frame of the planter, substantially as described.

4. In a check-rower corn-planter, the combination, with the supports for the tappet-wire, of a throw-off device for said wire, comprising a swinging plate or arm having a projection for lifting the wire as the plate is swung, and having a guard hook or projection for holding the wire in place while in operation, substantially as described.

5. In a check-rower corn-planter, the combination, with the supports for the tappet-wire, of the swinging plate G, having the projection G', the guard $G^5$, and the rod $G^2$, suitably connected to the main frame of the machine, substantially as described.

6. In a check-rower corn-planter, the combination, with the main brackets of the check-rower, of the frame for the wire-supports adjustably sustained upon said brackets, whereby said frame can be shifted independently of the brackets, substantially as described.

7. In a check-rower corn-planter, the combination, with the main brackets of the check-rower, of the frame for the wire-supports adjustably sustained upon said brackets, whereby said frame can be shifted independently of the brackets, the forked lever, the driving-pawl adjustably connected to the forked lever, and suitable operating mechanism whereby said driving-pawl imparts motion to the shake-bar of the seed-slides, substantially as described.

8. In a check-rower corn-planter, the combination, with the forked lever for the tappet-wire, of mechanism for imparting movement from said lever to the seed-slides, comprising a driving-pawl connected with the forked lever, a driving-wheel, and an operating-rod extending from said wheel and connected with the rocking lever that moves the shake-bar, substantially as described.

9. In a check-rower corn-planter, the combination, with the forked lever for the tappet-wire, of mechanism for imparting movement from said lever to the feed-slides, comprising a driving-pawl connected with the forked lever, a driving-wheel adapted for engagement with said pawl, said pawl and wheel being sustained in horizontal position, and an operating-rod extending from said wheel and connected to the rocking lever that operates the shake-bar, substantially as described.

10. In a check-rower corn-planter, the combination, with the forked lever for the tappet-wire, of mechanism for imparting movement from said lever to the feed-slides, comprising a driving-pawl, a driving-wheel for engagement with said pawl, and provided with a suitable check-pawl to guard against backward movement, and a rod connecting said wheel with the shake-bar, substantially as described.

11. In a check-rower corn-planter, the combination, with the forked lever for the tappet-wire, of mechanism for imparting movement from said forked lever to the seed-slides, comprising a driving-pawl provided with teeth, a driving-wheel having arms projecting therefrom to engage with the pawls, said pawl having its teeth arranged to be disengaged from the arms of the wheel during the backward movement of the forked lever, substantially as described.

12. In a check-rower corn-planter, the combination, with the forked lever for the tappet-wire, of mechanism for imparting movement from said forked lever to the seed-slides, comprising a driving-pawl connected with the forked lever, a driving-wheel having projecting arms for co-operation with said pawl, and having stops or flanges for holding the wheel and pawl in engagement during the forward movement of the forked lever, and an operating-rod connecting said wheel with the rocking lever that moves the shake-bar, substantially as described.

13. In a check-rower corn-planter, the combination, with the forked lever for the tappet-wire, of mechanism for imparting movement from said lever to the seed-slides, comprising a driving-pawl having stops at its front and rear ends, a driving-wheel having arms adapted to engage with said stops to prevent the accidental turning of the wheel, and an operating-rod connecting said wheel with the rocking lever that operates the shake-bar, substantially as described.

14. In a corn-planter, the combination, with the forked lever K, of the driving-pawl L, the driving-wheel M, the operating-rod P, and the rock-lever S, substantially as described.

15. In a check-rower corn-planter, the combination, with the rocking lever that moves the shake-bar, of an operating-rod connected to said lever, extending across the machine, and detachably connected with the check-rower mechanism at each side of the machine, and suitable means for throwing said rod out of engagement with the operating mechanism at either side of the machine, substantially as described.

16. In a check-rower corn-planter, the combination, with the rocking lever that moves the shake-bar, of an operating-rod in connection with said lever and detachably connected to the check-rower mechanism at each side of the machine, and suitable means for simultaneously throwing said rod out of engagement with the operating mechanism at one side of the machine and into engagement with the operating mechanism at the other side of the machine, substantially as described.

17. In a check-rower corn-planter, the combination, with the rocking lever that moves the shake-bar, of an operating-rod for connecting said lever with the check-rower mechanism at each side of the machine, and a disengaging device for said operating-rod, comprising pivoted levers adapted to lift said operating-rod, said levers being connected together, so that when the operating mechanism is thrown into engagement at one side of the machine it will be thrown out of engagement at the opposite side, substantially as described.

18. In a check-rower corn-planter, the combination, with the rocking lever that moves the shake-bar, of an operating-rod for said lever, detachably connected with the check-rower mechanism at each side of the machine, and a disengaging device for said operating-rod, having a connection extending in a position to be moved as the tappet-wire is placed upon its supports, substantially as described.

19. In a check-rower corn-planter, the combination, with the rocking lever that moves the shake-bar, of an operating-rod for said lever, detachably connected with the check-rower mechanism at each side of the machine, and a disengaging device for said operating-rod, comprising two pivoted levers connected together and one at each side of the machine, and a connection extending from each of said levers into a position to be moved by the tappet-wire as it is placed upon its supports, substantially as described.

20. In a check-rower corn-planter, the combination, with the forked lever and suitable connecting mechanism at each side of the machine, of the operating-rod P, the pivoted lifting-levers V, connected together, and the arms W, substantially as described.

21. In a check-rower corn-planter, the combination, with the rocking lever that moves the shake-bar, of an operating-rod in connection with the check-rower mechanism at each side of the planter and detachably connected to the rocking lever, whereby said operating-rod can be readily removed when the planter is to be worked by hand, substantially as described.

22. In a check-rower corn-planter, the combination, with the rocking lever that moves the shake-bar, of an operating-rod in connection with the check-rower mechanism at each side of the planter and an adjustable connecting or bearing pin between the operating-rod and rocking lever, whereby the extent of throw of the shake-bar may be varied, substantially as described.

CHARLES E. SWENEY.

Witnesses:
GEO. P. FISHER, Jr.,
DUKE F. BAXTER.